United States Patent
Aramata et al.

(10) Patent No.: US 7,658,863 B2
(45) Date of Patent: Feb. 9, 2010

(54) SI-C-O COMPOSITE, MAKING METHOD, AND NON-AQUEOUS ELECTROLYTE SECONDARY CELL NEGATIVE ELECTRODE MATERIAL

(75) Inventors: Mikio Aramata, Usui-gun (JP); Satoru Miyawaki, Usui-gun (JP); Hirofumi Fukuoka, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 696 days.

(21) Appl. No.: 11/185,902

(22) Filed: Jul. 21, 2005

(65) Prior Publication Data

US 2006/0022198 A1    Feb. 2, 2006

(30) Foreign Application Priority Data

Jul. 30, 2004    (JP)    ............................. 2004-223719

(51) Int. Cl.
   *H01M 4/58*    (2006.01)
(52) U.S. Cl. .................... 252/182.1; 252/500; 252/516; 252/521.3; 429/218.1; 429/231.4; 501/92; 501/96.5; 264/44; 264/625; 423/345; 423/440; 428/407; 427/219; 427/228; 427/249.1
(58) Field of Classification Search ................. 252/500, 252/518.1, 182.1; 501/87, 91, 92, 95.1; 528/33, 528/34, 37; 264/624, 625
See application file for complete search history.

(56) References Cited

U.S. PATENT DOCUMENTS

| | | | |
|---|---|---|---|
| 5,162,480 A * | 11/1992 | Schilling et al. .............. 528/23 |
| 5,322,825 A * | 6/1994 | Leung et al. .................. 501/92 |
| 5,395,711 A | 3/1995 | Tahara et al. | |
| 5,478,671 A | 12/1995 | Idota | |
| 5,639,844 A * | 6/1997 | Blum et al. .................... 528/15 |
| 5,824,280 A * | 10/1998 | Dahn et al. .................. 423/325 |
| 6,066,414 A | 5/2000 | Imoto et al. | |
| 6,383,686 B1 | 5/2002 | Umeno et al. | |
| 6,589,696 B2 * | 7/2003 | Matsubara et al. ........ 429/231.8 |
| 6,638,662 B2 | 10/2003 | Takeuchi et al. | |
| 2003/0104131 A1 * | 6/2003 | Konno et al. ............. 427/376.2 |
| 2003/0235762 A1 | 12/2003 | Fukui et al. | |
| 2004/0106040 A1 * | 6/2004 | Fukuoka et al. ............. 429/212 |

FOREIGN PATENT DOCUMENTS

| | | |
|---|---|---|
| CN | 1505187 | 6/2004 |
| JP | 5-174818 | 7/1993 |
| JP | 6-60867 | 3/1994 |
| JP | 10-294112 | 11/1998 |
| JP | 11-102705 | 4/1999 |
| JP | 2997741 | 11/1999 |
| JP | 2000-215887 | 8/2000 |
| JP | 2000-243396 | 9/2000 |
| JP | 2002-42806 | 2/2002 |
| JP | 2004-22433 | 1/2004 |

* cited by examiner

*Primary Examiner*—Stanley Silverman
*Assistant Examiner*—Kallambella Vijayakumar
(74) *Attorney, Agent, or Firm*—Oblon, Spivak, McClelland, Maier & Neustadt, L.L.P.

(57) ABSTRACT

A Si—C—O composite powder is obtained by curing a reactive silane or siloxane having crosslinkable groups through heat curing or catalytic reaction into a crosslinked product and sintering the crosslinked product in an inert gas stream at a temperature of 700–1,400° C. into an inorganic state. It exhibits satisfactory cycle performance when used as the negative electrode material for non-aqueous electrolyte secondary cells.

18 Claims, 2 Drawing Sheets

# SI-C-O COMPOSITE, MAKING METHOD, AND NON-AQUEOUS ELECTROLYTE SECONDARY CELL NEGATIVE ELECTRODE MATERIAL

CROSS-REFERENCE TO RELATED APPLICATION

This non-provisional application claims priority under 35 U.S.C. §119(a) on Patent Application No. 2004-223719 filed in Japan on Jul. 30, 2004, the entire contents of which are hereby incorporated by reference.

TECHNICAL FIELD

This invention relates to a Si—C—O composite serving as a siliceous material which is believed useful as high-capacity negative electrode active material for lithium ion secondary cells; a method for preparing the same; and a non-aqueous electrolyte secondary cell negative electrode material comprising the composite.

BACKGROUND ART

With the recent remarkable development of potable electronic equipment, communications equipment and the like, a strong demand for high energy density secondary batteries exists from the standpoints of economy and size and weight reductions. One prior art method for increasing the capacity of secondary batteries is to use oxides as the negative electrode material, for example, oxides of V, Si, B, Zr, Sn or the like or complex oxides thereof (see JP-A 5-174818 and JP-A 6-060867 corresponding to U.S. Pat. No. 5,478,671), metal oxides quenched from the melt (JP-A 10-294112), silicon oxide (Japanese Patent No. 2,997,741 corresponding to U.S. Pat. No. 5,395,711), and $Si_2N_2O$ and $Ge_2N_2O$ (JP-A 11-102705 corresponding to U.S. Pat. No. 6,066,414). Conventional methods of imparting conductivity to the negative electrode material include mechanical alloying of SiO with graphite, followed by carbonization (see JP-A 2000-243396 corresponding to U.S. Pat. No. 6,638,662), coating of silicon particles with a carbon layer by chemical vapor deposition (JP-A 2000-215887 corresponding to U.S. Pat. No. 6,383, 686), coating of silicon oxide particles with a carbon layer by chemical vapor deposition (JP-A 2002-042806), and formation of a film using a polyimide binder followed by sintering (JP-A 2004-022433 corresponding to U.S. 2003-0235762 A).

The foregoing prior art methods are successful in increasing the charge/discharge capacity and energy density, but still leave several problems including insufficient cycle performance, substantial volume changes of the negative electrode film upon charge/discharge cycles, and delamination from the current collector. They fail to fully meet the characteristics required in the market and are thus not necessarily satisfactory. It would be desirable to have a negative electrode active material having improved cycle performance and a high energy density.

In particular, Japanese Patent No. 2,997,741 uses silicon oxide as the negative electrode material in a lithium ion secondary cell to provide an electrode with a high capacity. As long as the present inventors have confirmed, there is left a room for further improvement as demonstrated by a still high irreversible capacity on the first charge/discharge cycle and cycle performance below the practical level. With respect to the technique of imparting conductivity to the negative electrode material, JP-A 2000-243396 suffers from the problem that solid-to-solid fusion fails to form a uniform carbon coating, resulting in insufficient conductivity. In the method of JP-A 2000-215887 which can form a uniform carbon coating, the negative electrode material based on silicon undergoes excessive expansion and contraction upon adsorption and desorption of lithium ions, meaning impractical operation, and loses cycle performance. Thus, the charge/discharge quantity must be limited. In JP-A 2002-042806, despite a discernible improvement of cycle performance, due to precipitation of silicon crystallites, insufficient structure of the carbon coating and insufficient fusion of the carbon coating to the substrate, the capacity gradually lowers as charge/discharge cycles are repeated, and suddenly drops after a certain number of charge/discharge cycles. This approach is thus insufficient for use in secondary cells.

SUMMARY OF THE INVENTION

An object of the present invention is to provide a Si—C—O composite which enables to manufacture a negative electrode for a lithium ion secondary cell having better cycle performance; a method for preparing the same; and a non-aqueous electrolyte secondary cell negative electrode material.

The inventor has discovered a Si—C—O material which is successful, despite a somewhat inferior capacity to silicon and silicon oxide, in improving the cycle performance over the silicon and silicon oxide based materials and minimizing the volume change during charge/discharge cycles which has been an outstanding issue with the siliceous negative electrode active materials.

The development of an electrode material having an increased charge/discharge capacity is very important and many engineers have been engaged in the research and development thereof. Under the circumstances, silicon, silicon oxides ($SiO_x$) and silicon alloys are of great interest as the negative electrode active material for lithium ion secondary cells because of their large capacity. Only few of them have been used in practice because of their shortcomings including substantial degradation upon repeated charge/discharge cycles, that is, poor cycle performance, and in the case of silicon oxides, low initial efficiency. Making investigations from such a standpoint with the target of improving cycle performance and initial efficiency, the inventor found that thermal CVD treatment of silicon oxide powder to provide a carbon coat led to a substantial improvement in performance as compared with the prior art. Continuing a study on the stable structure having alleviated the volume change associated with occlusion and release of lithium, the inventor found that the above problems of lithium ion secondary cell negative electrode active material are overcome by coating surfaces of silicon or silicon alloy microparticulates with an inert robust substance such as Si—C, Si—C—O or Si—N composite, granulating and introducing voids in the interior. The resulting material has a consistent high charge/discharge capacity and achieves drastic improvements in cyclic charge/discharge operation and efficiency thereof.

From the capacity standpoint, however, siliceous materials have charge/discharge capacities which are unnecessarily high in some applications. It would thus be desirable to have a material having a capacity which is only about 1.5 to 3 times the current carbon-based materials and better cycle performance.

Continuing a study on the stable structure having alleviated the volume change associated with occlusion and release of lithium, the inventor has found that a Si—C—O composite obtained by heating a silane and/or siloxane compound, which has been highly crosslinked through addition reaction or the like, in an inert gas stream and pulverizing the resulting sintered product has a capacity as the lithium ion cell negative electrode material which is somewhat inferior to silicon oxide-based materials, but is drastically improved in long-term stability and initial efficiency. Additionally, a Si—C—O composite obtained by previously adding a graphite based material, which is currently used as the lithium ion secondary cell negative electrode active material, to a silane and/or siloxane compound in the uncured state, followed by similar curing, sintering and pulverization has a capacity which is higher than the graphite based material and controllable to any desired value, and improved properties including cycle performance. In order to enhance the adhesion between graphite particle surfaces and the sintering resin, the surface treatment of graphite particles with a silane coupling agent to become hydrophobic is effective. Although the Si—C—O composite powder as produced is more or less conductive, further thermal CVD treatment of the Si—C—O composite particles to provide a carbon coat leads to substantial improvements in performance over the prior art materials.

Therefore, the present invention provides a Si—C—O composite, a method for preparing the same, and a non-aqueous electrolyte secondary cell negative electrode material, as defined below.

In one aspect, the present invention provides a Si—C—O composite obtained by curing a reactive silane or siloxane having crosslinkable groups or a mixture thereof through heat curing or catalytic reaction into a crosslinked product and sintering the crosslinked product in an inert gas stream at a temperature in the range of 700 to 1,400° C. into an inorganic state.

In one preferred embodiment, particulate graphite is added to the silane, siloxane or mixture thereof as a conductive material and/or lithium-occluding material in an amount of 1 to 80% by weight based on the total weight of the silane, siloxane or mixture thereof and the particulate graphite. Optionally, the particulate graphite has been surface treated with at least one organosilicon surface treating agent selected from the group consisting of a silane coupling agent, a (partial) hydrolyzate thereof, a silylating agent and a silicone resin.

In one preferred embodiment, the reactive silane or siloxane is one or more silanes or siloxanes having the general formulae (1) to (5).

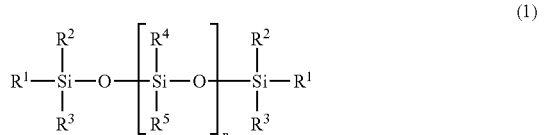

(1)

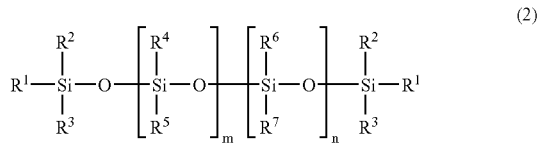

(2)

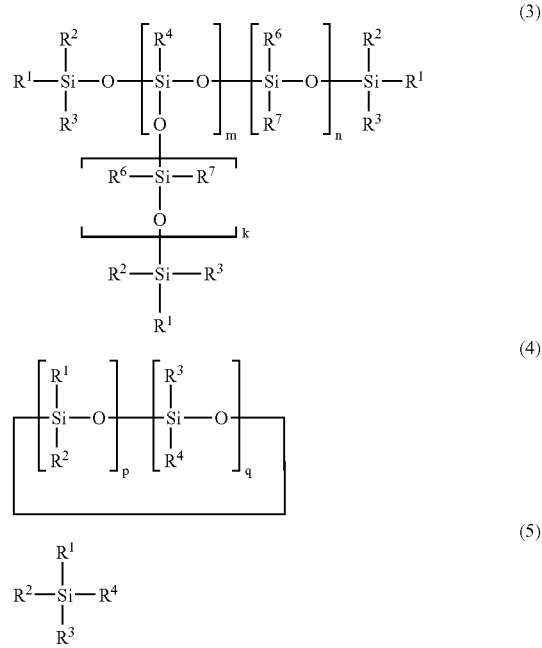

Herein $R^1$ to $R^7$ are each independently a hydrogen atom, hydroxyl group, hydrolyzable group or monovalent hydrocarbon group, m, n and k are numbers of 0 to 2,000, p and q are numbers of 0 to 10, p and q are not equal to 0 at the same time.

Preferably, the reactive silane or siloxane is a combination of a silane and/or siloxane having at least two SiH groups in a molecule and a siloxane having at least two aliphatic unsaturated groups in a molecule per ten silicon atoms, in which hydrosilylation reaction takes place in the presence of a hydrosilylation catalyst to form a crosslinked product.

In another preferred embodiment, the reactive silane or siloxane is of the average formula: $C_wH_xSiO_yN_z$ wherein w, x and y are positive numbers, z is 0 or a positive number, and (w−y) is greater than 0, and has at least one crosslinkable site per four silicon atoms.

The Si—C—O composite is typically in the form of particles having a void content of 1 to 70% by volume.

The surface of the Si—C—O composite powder is preferably coated with carbon in an amount of 1 to 50% by weight based on the entire weight of the Si—C—O composite powder coated with carbon.

In another aspect, the present invention provides a method for preparing a Si—C—O composite, comprising the steps of curing a reactive silane or siloxane having crosslinkable groups or a mixture thereof through heat curing or catalytic reaction into a crosslinked product and sintering the crosslinked product in an inert gas stream at a temperature in the range of 700 to 1,400° C. into an inorganic state.

The method may further comprise, prior to the curing step, adding particulate graphite as a conductive material and/or lithium-occluding material to the silane, siloxane or mixture thereof, in an amount of 1 to 80% by weight based on the total weight of the silane, siloxane or mixture thereof and the particulate graphite. Prior to addition, the particulate graphite may be surface treated with at least one organosilicon surface treating agent selected from the group consisting of a silane coupling agent, a (partial) hydrolyzate thereof, a silylating agent and a silicone resin.

The method may further comprise, after the curing and/or sintering step, pulverizing to an average particle size of 0.1 to 30 μm.

In a preferred embodiment, the reactive silane or siloxane is one or more silanes or siloxanes having the general formulae (1) to (5) defined above.

Preferably, the reactive silane or siloxane is a combination of a silane and/or siloxane having at least two SiH groups in a molecule and a siloxane having at least two aliphatic unsaturated groups in a molecule per ten silicon atoms, in which hydrosilylation reaction takes place in the presence of a hydrosilylation catalyst to form a crosslinked product. Or the reactive silane or siloxane is of the average formula: $C_wH_xSiO_yN_z$ wherein w, x and y are as defined above.

The surface of the Si—C—O composite powder is preferably coated with carbon in an amount of 1 to 50% by weight based on the entire weight of the Si—C—O composite powder coated with carbon.

In a further aspect, the present invention provides a negative electrode material for a non-aqueous electrolyte secondary cell, comprising the Si—C—O composite defined above, and more specifically, a negative electrode material for a non-aqueous electrolyte secondary cell, comprising a mixture of the Si—C—O composite defined above and a conductive agent, an amount of the conductive agent being 5 to 60% by weight of the mixture and a total amount of carbon being 20 to 90% by weight of the mixture.

The Si—C—O composite of the invention is novel and exhibits satisfactory cycle performance when used as the negative electrode material for non-aqueous electrolyte secondary cells.

DESCRIPTION OF THE PREFERRED EMBODIMENTS

As used herein, the term "conductive" refers to electrical conduction.

For use as the lithium ion secondary cell negative electrode active material, a siliceous material is expected promising because of its charge/discharge capacity which is several times greater than that of the current mainstream graphite-derived materials, but is prevented from practical use by the degradation of performance due to a substantial volume change associated with adsorption and desorption of lithium and a failure of electrode film with repeated charge/discharge operation. The present invention relates to a Si—C—O composite which improves the cycle performance and efficiency over the siliceous material. The Si—C—O composite has a network of silicon bound by robust Si—C bonds and silicon capable of adsorption and desorption of lithium and is arrived at by curing a reactive silane or siloxane containing a high level of crosslinkable groups or a mixture thereof through heat curing or catalytic reaction into a highly crosslinked product and sintering the crosslinked product in an inert gas stream at a temperature in the range of 700 to 1,400° C. into an inorganic state. To enhance conductivity within the particle interior, conductive carbon, graphite or the like may be added to the silane or siloxane. Further preferably, particles are surface coated or covered with carbon such that carbon is fused to at least part of the particle surface.

As used herein, the term silane or siloxane "containing a high level of crosslinkable groups" means that the compound contains, on the average, at least one, preferably at least two, and more preferably at least 2.5 crosslinkable groups per ten silicon atoms. The term "highly crosslinked product" refers to a cured or crosslinked product resulting from heat curing or catalytic reaction of the reactive silane or siloxane containing a high level of crosslinkable groups or mixture thereof.

Examples of the crosslinkable groups include a combination of SiH group and an aliphatic unsaturated group such as alkenyl group or alkynyl group which can form a crosslinked structure by hydrosilylation reaction, a combination of hydroxy group (silanol group) or an organoxy group such as alkoxy group each bonded to silicon atom and a hydrolyzable group such as alkoxy group, acyloxy group, alkenyloxy group or ketoxime group (iminoxy group) each bonded to silicon atom which can form a crosslinked structure by condensation reaction, an alkenyl group bonded to silicon atom which can form a crosslinked structure by radical reaction (typically using an organic peroxide), and a combination of (meth)acryloxy functional group or mercapto functional group and an alkenyl group which can form a crosslinked structure by photo reaction, typically ultraviolet ray irradiation.

Figure 1:
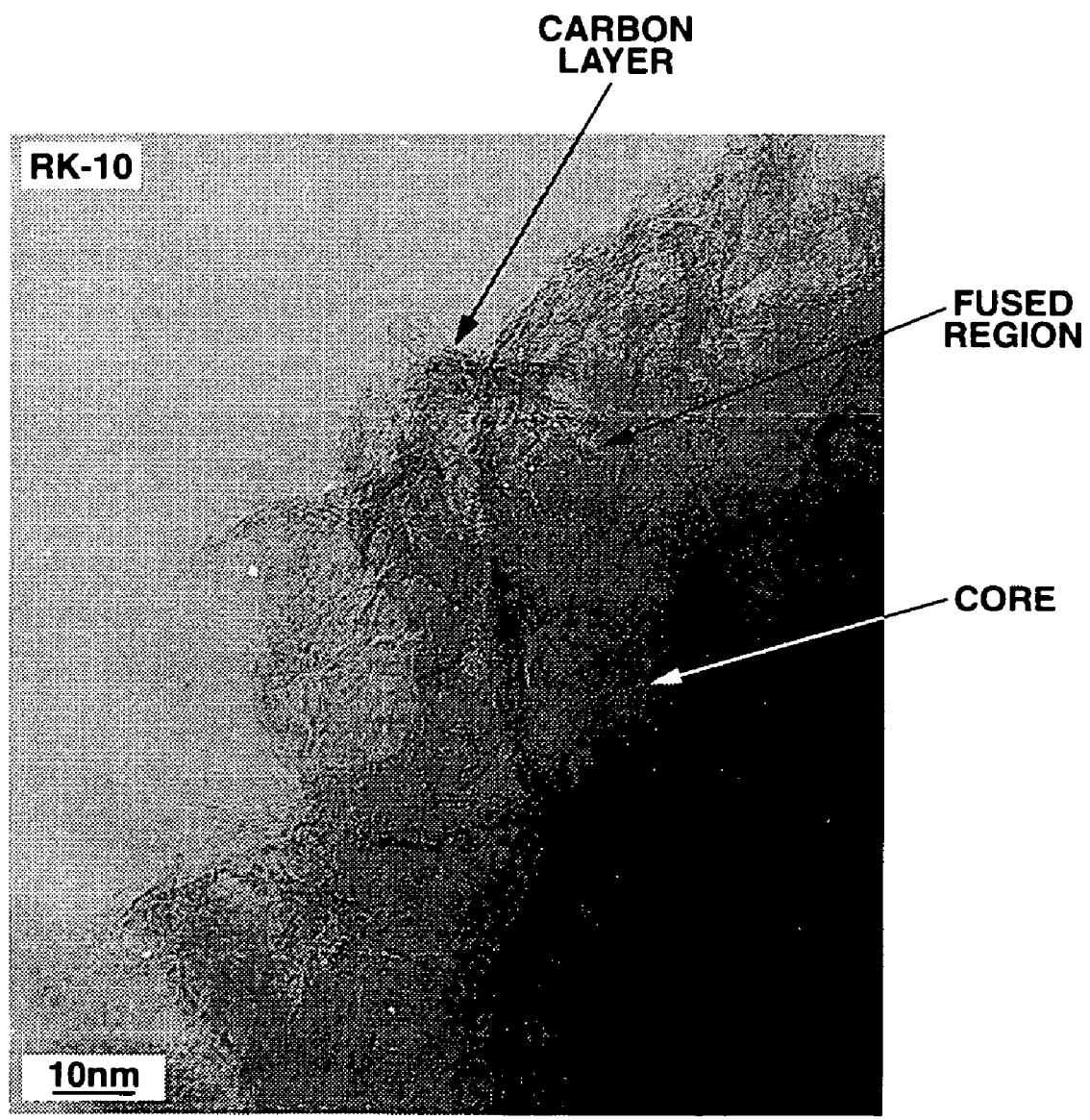
FIG. 1 is a photomicrograph under TEM showing the CVD carbon layer fused to the matrix.

Also, the term "coated with carbon" or "fused" refers to a state in which carbon and silicon coexist between the carbon layer in laminar arrangement and the inner Si—C—O composite and the carbon layer and the composite are melt-joined together at the interface. The fused state is observable under a transmission electron microscope (see FIG. 1).

The Si—C—O composite of the invention should preferably meet the following conditions.

i) The amount of oxygen in bond with silicon which can be zero-valent silicon capable of occluding and releasing lithium ions when used in a lithium ion secondary cell negative electrode can be measured to be 1 to 30% by weight, and more preferably 5 to 25% by weight, by a method according to ISO DIS 9286, the method of measuring overall oxygen in silicon carbide fine powder. By the same method, the total amount of carbon is measured to be 5 to 80% by weight, and more preferably 15 to 60% by weight.

ii) A Si—C—O composite particle has the structure that voids are observable when its interior is observed under a scanning electron microscope (SEM).

The organosilicon compound (silane and siloxane) from which the Si—C—O composite of the invention is prepared may be any organosilicon compound having at least two crosslinkable functional groups bonded to silicon atoms, for example, aliphatic unsaturated groups (e.g., alkenyl groups), hydroxyl groups, hydrogen atoms (SiH groups) or hydrolyzable groups, alone or in combination of two or more compounds. The organosilicon compounds may be straight, branched or cyclic, and specifically, include straight organopolysiloxanes having the general formulae (1) and (2), branched organopolysiloxanes having the general formula (3), cyclic organopolysiloxanes having the general formula (4), and silane or silicone resins having the general formula (5).

The preferred organosilicon compounds are liquid at room temperature (25° C.) although solid organosilicon compounds as typified by silicone resins are acceptable as long as they have a softening point. Alternatively, the organosilicon compounds may be diluted with organic solvents in which the organosilicon compounds are dissolvable or non-reactive silicone oils. Suitable organic solvents include hexane, toluene and xylene, and a typical non-reactive silicone oil is dimethylpolysiloxane oil.

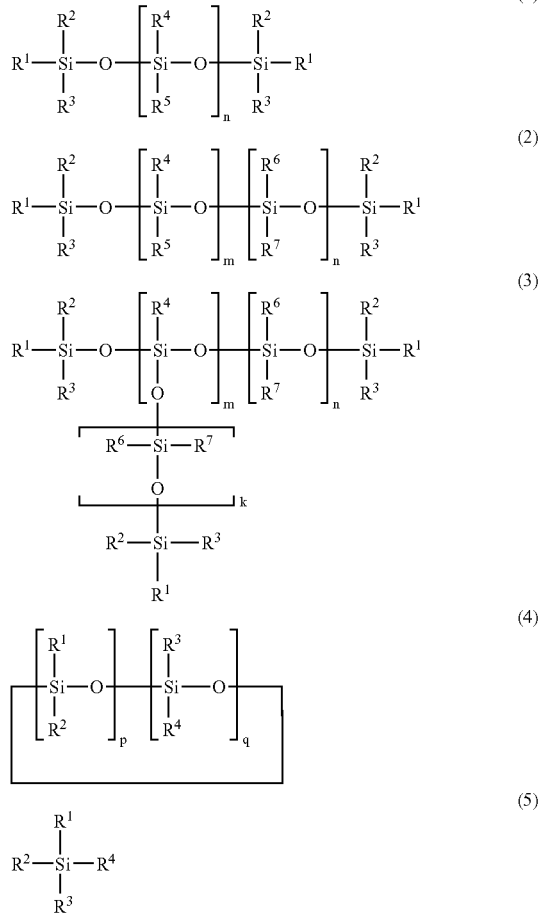

In the formulae, $R^1$ to $R^7$ are each independently a hydrogen atom, hydroxyl group, hydrolyzable group or monovalent hydrocarbon group. Preferred hydrolyzable groups include alkoxy, alkenyloxy, and acyloxy groups having 1 to 6 carbon atoms. Preferred monovalent hydrocarbon groups include those of 1 to 12 carbon atoms, more preferably 1 to 8 carbon atoms, for example, alkyl, alkenyl, alkynyl, aryl and aralkyl groups. Included are alkyl groups such as methyl, ethyl, propyl, butyl, and hexyl, alkenyl groups such as vinyl, allyl, butenyl, hexenyl and cyclohexenyl, alkynyl groups such as ethynyl, propynyl, butynyl and hexynyl, aryl groups such as phenyl and tolyl, and aralkyl groups such as benzyl and phenylethyl.

The subscripts m, n and k are numbers of 0 to 2,000, preferably 0 to 1,000, p and q are numbers of 0 to 10, p and q are not equal to 0 at the same time. Preferably p+q is from 3 to 10.

The crosslinkable organosilicon compounds, silanes and siloxanes are not particularly limited as long as they are generally used in the manufacture of silicones. Usually, a chain-like polymer of an organosilicon compound such as an organic siloxane polymer, when heated in a non-oxidizing gas stream, readily undergoes thermal cleavage on its main chain bonds and decomposes into low-molecular-weight components (e.g., cyclic oligomers of 3 to 6 monomer units) which will volatilize off. In contrast, silicon-carbon bonds formed by hydrosilylation reaction, for example, are resistant to heat. Then, for highly crosslinked products resulting from hydrosilylation, decomposition into low-molecular-weight components is less likely to occur, and even if occurs, the resulting substances are less volatile due to a high degree of crosslinking. This ensures effective conversion into an inorganic state during the firing step without volatilization. Among the silanes or siloxanes having the general formulae (1) to (5), an addition reaction curing organopolysiloxane composition is preferably used comprising a silane and/or siloxane having preferably at least 2, more preferably at least 3, even more preferably 4 to 2,000 SiH groups within the molecule and a siloxane having preferably at least 2, more preferably at least 3, even more preferably 4 to 50 aliphatic unsaturated groups (such as alkenyl and alkynyl groups) within the molecule and containing preferably at least 2, more preferably 2.5 to 10 aliphatic unsaturated groups per ten silicon atoms wherein hydrosilylation reaction takes place in the presence of a well-known hydrosilylation catalyst such as platinum or a platinum compound to form a crosslinked product.

This reaction is preferably carried out at a molar ratio of SiH groups to aliphatic unsaturated groups being from 0.8 to 2, especially from 0.9 to 1.2. The amount of the hydrosilylation catalyst added may be a catalytic amount which is typically about 5 to 1,000 ppm, preferably about 10 to 200 ppm, calculated as the weight of platinum. The reaction (or curing) temperature is preferably from room temperature (25° C.) to 300° C., more preferably 60 to 200° C. The reaction (or curing) time is usually about 5 minutes to about one hour.

It is also preferred to use a silicone resin having hydrolyzable groups such as hydroxyl, alkoxy, acyloxy, alkenyloxy or ketoxime (iminoxy) groups within the molecule, which can condense through catalytic reaction or non-catalytic reaction into a highly crosslinked product. Examples of the catalyst, if used, include well-known condensation catalysts for condensation curing organopolysiloxane compositions, for example, organotin compounds such as dialkyltin diorganic acids.

The other preferred organosilicon compound (silane or siloxane or mixture) used herein is of the average formula:

$$C_wH_xSiO_yN_z$$

wherein w, x and y are positive numbers, z is 0 or a positive number, and (w−y)>0, and has at least one crosslinkable site per four silicon atoms. Nitrogen may be bonded to silicon directly or indirectly via carbon or the like.

In preparing the Si—C—O composite of the invention, a carbonaceous material may be added to the organosilicon compound as a conductive material and/or lithium-occluding material. Although the characteristics of the carbonaceous material to be added are not particularly limited, preference is given to spherical or flake particles of graphite commonly used as the lithium ion secondary cell negative electrode material.

The amount of the carbonaceous material added is 1 to 80% by weight, preferably 5 to 80% by weight, more preferably to 70% by weight, even more preferably 10 to 50% by weight, based on the total weight of the organosilicon compound or mixture thereof and the carbonaceous material. Less than 1 wt % of the carbonaceous material may fail to impart sufficient conductivity whereas more than 80 wt % may lead to a reduced capacity. It is noted that the capacity of a non-aqueous electrolyte secondary cell negative electrode material comprising the inventive Si—C—O composite is determined from the capacity of graphite alone and the capacity of the Si—C—O composite and the mixing ratio therebetween.

This means that the overall capacity decreases as the amount of low-capacity graphite material added increases.

In the embodiment wherein particulate graphite is added, graphite particles are advantageously surface treated with an organosilicon surface treating agent or agents for improving the adhesion between graphite particles and the Si—C—O composite. The surface treating agent is selected from the group consisting of silane coupling agents, (partial) hydrolytic condensates thereof, silylating agents, and silicone resins, as represented by formulae (6) to (8). It is noted that the (partial) hydrolytic condensates refers to hydrolytic condensates or partial hydrolytic condensates.

  (6)

  (7)

  (8)

$R^8$ is a monovalent organic group, Y is a monovalent hydrolyzable group or hydroxyl group, Z is a divalent hydrolyzable group, a is an integer of 1 to 4, b is a positive number of 0.8 to 3, preferably 1 to 3; $R^9$ is hydrogen or a substituted or unsubstituted monovalent hydrocarbon group of 1 to 10 carbon atoms, $R^{10}$ is hydrogen or a substituted or unsubstituted monovalent hydrocarbon group of 1 to 6 carbon atoms, c and d are 0 or positive numbers satisfying $0 \leq c \leq 2.5$, $0.01 \leq d \leq 3$, $0.5 \leq c+d \leq 3$.

Examples of $R^8$ include unsubstituted monovalent hydrocarbon groups, such as alkyl, cycloalkyl, alkenyl, aryl and aralkyl groups of 1 to 12 carbon atoms, preferably 1 to 10 carbon atoms; substituted monovalent hydrocarbon groups in which some or all of the hydrogen atoms on the foregoing groups are replaced by functional groups such as halogen atoms (e.g., chloro, fluoro, bromo), cyano, oxyalkylene (e.g., oxyethylene), polyoxyalkylene (e.g., polyoxyethylene), (meth)acrylic, (meth)acryloxy, acryloyl, methacryloyl, mercapto, amino, amide, ureido, and epoxy groups; and the foregoing substituted or unsubstituted monovalent hydrocarbon groups which are separated by an oxygen atom, NH, $NCH_3$, $NC_6H_5$, $C_6H_5NH$—, $H_2NCH_2CH_2NH$— or similar group.

Illustrative examples of $R^8$ include alkyl groups such as $CH_3$—, $CH_3CH_2$—, $CH_3CH_2CH_2$—, alkenyl groups such as $CH_2$=CH—, $CH_2$=$CHCH_2$—, $CH_2$=$C(CH_3)$—, aryl groups such as $C_6H_5$—, $ClCH_2$—, $ClCH_2CH_2CH_2$—, $CF_3CH_2CH_2$—, $CNCH_2CH_2$—, $CH_3$—$(CH_2CH_2O)_n$—$CH_2CH_2CH_2$ wherein s is an integer of 1 to 3, $CH_2(O)CHCH_2OCH_2CH_2CH_2$— wherein $CH_2(O)CHCH_2$ stands for glycidyl, $CH_2$=$CHCOOCH_2$—,

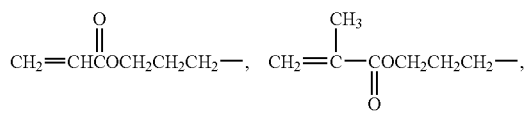

$HSCH_2CH_2CH_2$—, $NH_2CH_2CH_2CH_2$—, $NH_2CH_2CH_2NHCH_2CH_2CH_2$—, $NH_2CONHCH_2CH_2$—, etc. Preferred examples of $R^8$ include γ-glycidyloxypropyl, β-(3,4-epoxycyclohexyl)ethyl, γ-aminopropyl, γ-cyanopropyl, γ-acryloxypropyl, γ-methacryloxypropyl, and γ-ureidopropyl.

The monovalent hydrolyzable groups represented by Y include alkoxy groups such as —$OCH_3$, —$OCH_2CH_3$, amino groups such as —$NH_2$, —NH—, —N=, —$N(CH_3)_2$, —Cl, oxyimino groups such as —ON=$C(CH_3)CH_2CH_3$, aminooxy groups such as —$ON(CH_3)_2$, carboxyl groups such as —$OCOCH_3$, alkenyloxy groups such as —$OC(CH_3)$=$CH_2$, —$CH(CH_3)$—$COOCH_3$, —$C(CH_3)_2$—$COOCH_3$, etc. The groups of Y may be the same or different. Preferred examples of Y include alkoxy groups such as methoxy and ethoxy, and alkenyloxy groups such as isopropenyloxy.

The divalent hydrolyzable groups represented by Z include imide residues (—NH—), substituted or unsubstituted acetamide residues, urea residues, carbamate residues, and sulfamate residues.

The subscript "a" is an integer of 1 to 4, preferably 3 or 4, b is a positive number of 0.8 to 3, preferably 1 to 3.

The monovalent hydrocarbon group represented by $R^9$ are the same as the monovalent hydrocarbon groups of 1 to 10 carbon atoms exemplified above for $R^1$ to $R^7$. The monovalent hydrocarbon group represented by $R^{10}$ are the same as the monovalent hydrocarbon groups of 1 to 6 carbon atoms exemplified above for $R^1$ to $R^7$.

The subscripts c and d are 0 or positive numbers satisfying $0 \leq c \leq 2.5$, $0.01 \leq d \leq 3$, $0.5 \leq c+d \leq 3$, and preferably $1 \leq c \leq 2$, $1 \leq d \leq 2$, $2 \leq c+d \leq 3$.

Illustrative examples of the silane coupling agents include methyltrimethoxysilane, tetraethoxysilane, vinyltrimethoxysilane, methylvinyldimethoxysilane, γ-aminopropyltriethoxysilane, γ-mercaptopropyltrimethoxysilane, γ-cyanopropyltrimethoxysilane, N-β-(aminoethyl)-γ-aminopropyltrimethoxysilane, γ-methacryloxypropyltrimethoxysilane, γ-glycidyloxypropyltrimethoxysilane, β-(3,4-epoxycyclohexyl)ethyltrimethoxysilane, and γ-ureidopropyltrimethoxysilane. The silane coupling agents may be used alone or in admixture of two or more. Hydrolytic condensates and/or partial hydrolytic condensates of these silanes are also acceptable.

Illustrative examples of the silylating agents having formula (7) include organosilazanes such as hexamethyldisilazane, divinyltetramethyldisilazane, tetravinyldimethyldisilazane, and octamethyltrisilazane, N,O-bis(trimethylsilyl)acetamide, N,O-bis(trimethylsilyl)carbamate, N,O-bis(trimethylsilyl)sulfamate, N,O-bis(trimethylsilyl)trifluoroacetamide, and N,N'-bis(trimethylsilyl)urea. Of these, divinyltetramethyldisilazane is most preferred.

The surface treating agent is typically used in an amount of 0.1 to 10% by weight, preferably 1 to 5% by weight, more preferably 1 to 3% by weight based on the weight of graphite particles.

The Si—C—O composite powder of the invention may be surface-coated with carbon. The amount of carbon coated or vapor deposited on the Si—C—O composite powder of the invention is preferably 1 to 50% by weight, more preferably 5 to 30% by weight and even more preferably 5 to 20% by weight based on the Si—C—O composite powder (i.e., Si—C—O composite powder whose surface has been coated with a conductive coating by thermal CVD). If the amount of carbon coated or deposited is less than 1 wt %, the Si—C—O composite powder used alone as a negative electrode active material forms a negative electrode film having less than desired conductivity, indicating that the carbon coating is meaningless. If the amount of carbon coated or deposited is more than 50 wt %, indicating a too large proportion of carbon, the negative electrode capacity may be reduced, detracting from the benefits of the invention.

Each Si—C—O composite particle (containing voids within itself) preferably has a void content of 1 to 70% by volume, especially 10 to 50% by volume. A void content of less than 1% by volume may lead to the increased risk that particles collapse by volume changes during charge/discharge operation. A void content of more than 70% by volume may lead to a reduced capacity or liquid electrolyte leakage. The void content is computed from a specific gravity.

The Si—C—O composite particles preferably have an average particle size of 0.5 to 50 µm, more preferably 5 to 20 µm, in view of formation of a negative electrode film and cycle performance when the particles are used as negative electrode material for lithium ion secondary cells. It is noted that the average particle size is determined as a weight average diameter $D_{50}$ (particle diameter at 50% by weight cumulative, or median diameter) upon measurement of particle size distribution by laser light diffractometry.

Now, it is described how to prepare the Si—C—O composite particles of the invention.

According to the invention, Si—C—O composite particles are prepared by curing a reactive organosilicon compound having crosslinkable groups or a mixture thereof through heat curing or catalytic reaction into a crosslinked product and sintering the crosslinked product in an inert gas stream at a temperature in the range of 700 to 1,400° C., preferably 800 to 1,300° C., more preferably 900 to 1,200° C. into an inorganic state. Otherwise, the preparation method is not particularly limited. The preferred preparation method of the invention includes the following stages I to IV.

Stage I:

By blending to the organosilicon compound or the mixture thereof graphite particles which have been sized to have an average particle size of 1 to 20 µm, preferably 3 to 10 µm and have been surface treated with at least one organosilicon surface treating agent selected from among the above-described silane coupling agents, (partial) hydrolytic condensates, silylating agents, and silicone resins, the adhesion between the graphite particles and the organosilicon compound or mixture thereof is enhanced, thereby improving cycle performance.

Stage II:

The organosilicon compound or mixture thereof, especially an addition curing organopolysiloxane composition comprising a vinylsiloxane, hydrogensiloxane and platinum catalyst, to which graphite particles obtained by Embodiment I are optionally added and thoroughly mixed together, is pre-cured at a temperature of 300° C. or lower, preferably 60 to 200° C. If necessary, an organic solvent is added to help form a uniform mixture. The precuring atmosphere is not particularly limited.

At this stage, the pre-cured product may be pulverized to a particle size of 0.1 to 30 µm, preferably 1 to 20 µm, for facilitating the subsequent pulverizing and sizing. Although the pulverizing technique is not particularly limited, pulverization in a dispersing medium is recommended because of the likelihood of electrostatic charges accumulating during the pulverization at this stage. The preferred dispersing media are organic solvents including hexane, toluene, methanol, methyl isobutyl ketone, dibutyl ether and isobutyl acetate, but not limited thereto.

Figure 2:
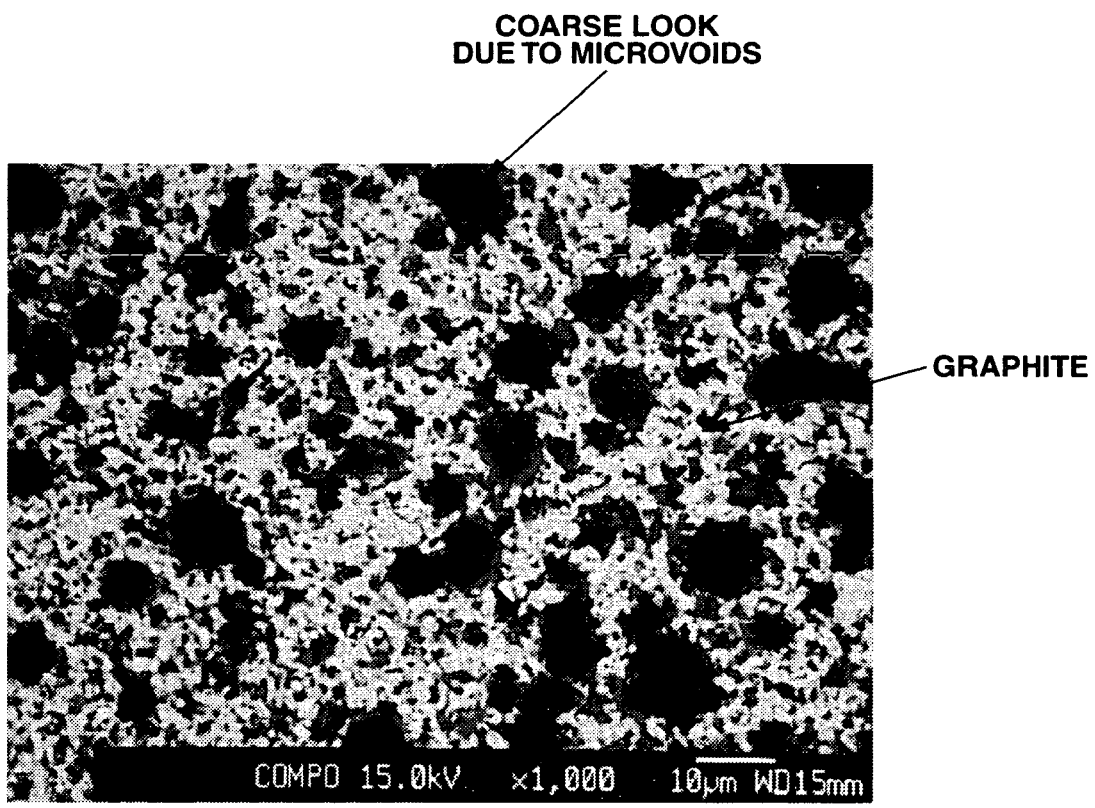
FIG. 2 is a cross-sectional photograph (BSE image) of a Si—C—O composite having graphite particles added thereto.

Stage III:

The pre-cured product is heat treated in an inert gas atmosphere at a temperature in the range of 700 to 1,400° C., preferably 800 to 1,300° C., more preferably 900 to 1,200° C., yielding Si—C—O composite particles containing voids in the interior. Si—C—O composite preferably means Si—C—O(C) composite in which graphite is added to Si—C—O composite. A back scattering electron (BSE) image of this composite [Si—C—O(C)] is shown in FIG. 2, indicating the presence of graphite and the coarse or porous state of the composite layer. Thereafter, the Si—C—O composite particles are again pulverized and sized to a particle size of 0.1 to 30 µm, preferably 1 to 20 µm. Any desired pulverizing technique may be employed. The inert gas atmosphere may be nitrogen, argon or the like.

Stage IV:

The Si—C—O composite particles obtained in Stage 1V are heat treated in an atmosphere containing at least an organic matter gas and/or vapor at a temperature in the range of 700 to 1,400° C., preferably 800 to 1,300° C., more preferably 900 to 1,200° C., for chemical vapor deposition on the particle surfaces.

In Stage I, any of usual surface treating techniques is applicable.

In Stage II, if a mixture of reactive vinylsiloxane and hydrogensiloxane containing a hydrosilylation catalyst such as platinum catalyst, optionally combined with graphite particles, is directly heated to a firing temperature in the elevated range without precuring at temperatures below 300° C., formation of low-molecular-weight siloxanes and cracking of siloxanes become predominant, resulting in increased losses.

In Stage III, a heat treatment temperature below 700° C. induces insufficient conversion of cured siloxane into an inorganic state, leading to a lowering of initial efficiency and cycle performance. A heat treatment temperature above 1,400° C. forces further conversion to silicon carbide SiC which is inactive as the lithium ion secondary cell negative electrode material, giving rise to unwanted problems with respect to cell operation.

In Stage IV, a carbon coating is formed preferably by effecting thermal CVD (chemical vapor deposition at or above 800° C.). CVD at high temperatures beyond 1,400° C. may force the conversion to silicon carbide as above. The time of thermal CVD is determined as appropriate relative to the amount of carbon deposited. During the treatment, particles sometimes agglomerate together, and if so, the agglomerates are subsequently disintegrated on a ball mill or the like. If desired, thermal CVD is similarly repeated again.

In the practice of the invention, the organic material to generate the organic matter gas is selected from those materials capable of producing carbon (graphite) through pyrolysis at the heat treatment temperature, especially in a non-oxidizing atmosphere. Exemplary are hydrocarbons such as methane, ethane, ethylene, acetylene, propane, butane, butene, pentane, isobutane, and hexane alone or in admixture of any, and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene alone or in admixture of any. Also, gas light oil, creosote oil and anthracene oil obtained from the tar distillation step are useful as well as naphtha cracked tar oil, alone or in admixture.

For the thermal CVD (thermal chemical vapor deposition), any desired reactor having a heating mechanism may be used in a non-oxidizing atmosphere. Depending on a particular purpose, a reactor capable of either continuous or batchwise treatment may be selected from, for example, a fluidized bed reactor, rotary furnace, vertical moving bed reactor, tunnel furnace, batch furnace and rotary kiln. The treating gas used herein may be the aforementioned organic gas alone or in admixture with a non-oxidizing gas such as Ar, He, $H_2$ or $N_2$.

According to the invention, the Si—C—O composite powder may be used as a negative electrode material, specifically a negative electrode active material to construct a non-aqueous electrolyte secondary cell, especially a lithium ion secondary cell, having a high capacity and improved cycle performance.

When a negative electrode is prepared using the inventive Si—C—O composite powder, a conductive agent such as graphite may be added to the powder. The type of conductive agent used herein is not critical as long as it is an electronically conductive material which does not undergo decomposition or alteration in the cell. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins.

On use of the Si—C—O composite powder, the conductive agent is not always necessary if the powder has been combined with graphite and/or coated with carbon by thermal CVD. If the powder has not been so treated or coated, the amount of conductive agent added is preferably 5 to 60% by weight, more preferably 10 to 50% by weight, even more preferably 20 to 40% by weight of the negative electrode-forming mixture of Si—C—O composite powder plus conductive agent. A mixture with less than 5 wt % of the conductive agent may form a less conductive electrode film, whereas a mixture with more than 60 wt % of the conductive agent may have a reduced charge/discharge capacity.

The total amount of carbon in the negative electrode-forming mixture of Si—C—O composite powder plus conductive agent is preferably 20 to 90% by weight, more preferably 25 to 50% by weight. A mixture with less than 20 wt % of carbon may lead to poor conductivity or the increased risk of particles collapsing by volume changes, whereas a mixture with more than 90 wt % of carbon may have a reduced capacity.

Using the negative electrode thus obtained, a lithium ion secondary cell can be fabricated. The lithium ion secondary cell thus constructed is characterized by the use of the Si—C—O composite as the negative electrode active material while the materials of the positive electrode, electrolyte, and separator and the cell design are not critical. For example, the positive electrode active material used herein may be selected from transition metal oxides such as $LiCoO_2$, $LiNiO_2$, $LiMn_2O_4$, $V_2O_5$, $MnO_2$, $TiS_2$ and $MoS_2$ and chalcogen compounds. The electrolytes used herein may be lithium salts such as lithium perchlorate in non-aqueous solution form. Examples of the non-aqueous solvent include propylene carbonate, ethylene carbonate, dimethoxyethane, γ-butyrolactone and 2-methyltetrahydrofuran, alone or in admixture. Use may also be made of other various non-aqueous electrolytes and solid electrolytes.

EXAMPLE

Examples of the invention are given below by way of illustration and not by way of limitation. In Examples, all parts and percents are by weight unless otherwise stated. The average particle size is determined as a cumulative weight average diameter $D_{50}$ (or median diameter) upon measurement of particle size distribution by laser light diffractometry.

Example 1

To a curable siloxane mixture of 120 grams (g) of tetramethyltetravinylcyclotetrasiloxane (LS-8670, Shin-Etsu Chemical Co., Ltd.) and 80 g of methylhydrogensiloxane (KF-99, Shin-Etsu Chemical Co., Ltd.) was added 0.1 g of a chloroplatinic acid catalyst (1% chloroplatinic acid solution). The mixture was thoroughly mixed and precured at 60° C. for one day. The precured mixture in mass form was placed in a glass container and further in an atmosphere-controllable, temperature-programmable muffle furnace where it was heated in a nitrogen atmosphere at 200° C. for 2 hours until it was fully cured. The cured product was crushed and then milled in a ball mill using hexane as a dispersing medium to an average particle size of 10 µm. Then the powder was placed in an alumina container, which was closed with a lid, and fired in an atmosphere-controllable, temperature-programmable muffle furnace in a nitrogen atmosphere at 1,000° C. for 3 hours. After cooling, the fired product was comminuted on a grinder (Masscolloider) with a set clearance of 20 µm, yielding Si—C—O composite particles having an average particle size of about 10 µm. This was analyzed according to ISO DIS 9286, with the results shown in Table 1.

Cell Test

The evaluation of Si—C—O composite powder as the negative electrode active material for a lithium ion secondary cell was carried out by the following procedure which was common to all Examples and Comparative Examples. A negative electrode material mixture was obtained by adding 42 parts of synthetic graphite (average particle diameter $D_{50}$=5 µm) to 48 parts of the Si—C—O composite. To the mixture, 10% of polyvinylidene fluoride was added. About 100 parts of N-methylpyrrolidone was then added thereto to form a slurry. The slurry was coated onto a copper foil of 20 µm gage and dried at 120° C. for one hour. Using a roller press, the coated foil was shaped under pressure into an electrode sheet, of which 2 $cm^2$ discs were punched out as the negative electrode.

To evaluate the charge/discharge performance of the negative electrode, a test lithium ion secondary cell was constructed using a lithium foil as the counter electrode. The electrolyte solution used was a non-aqueous electrolyte solution of lithium phosphorus hexafluoride in a 1/1 (by volume) mixture of ethylene carbonate and 1,2-dimethoxyethane in a concentration of 1 mol/liter. The separator used was a microporous polyethylene film of 30 µm thick.

The lithium ion secondary cell thus constructed was allowed to stand overnight at room temperature. Using a secondary cell charge/discharge tester (Nagano K.K.), a charge/discharge test was carried out on the cell. Charging was conducted with a constant current flow of 3 mA until the voltage of the test cell reached 0 V, and after reaching 0 V, continued with a reduced current flow so that the cell voltage was kept at 0 V, and terminated when the current flow decreased below 100 µA. Discharging was conducted with a constant current flow of 3 mA and terminated when the cell voltage rose above 2.0 V, from which a discharge capacity was determined.

The initial efficiency of this lithium ion secondary cell was determined. By repeating the above operations, the charge/discharge test on the lithium ion secondary cell was carried out 30 and 50 cycles. The test results are shown in Table 1.

Example 2

To 60 g of spherical synthetic graphite having an average particle size of 6 µm (MCMB6-28 by Osaka Gas Chemical Co., Ltd.) was added 2 g of divinyltetramethyldisilazane. The mixture was placed in a polyethylene bag and heated treated at 100° C. for 3 hours. It was then heated in a drier at 100° C. for one hour for removing ammonia. To the resulting powder were added a curable siloxane mixture consisting of 84 g of tetramethyltetravinylcyclotetrasiloxane (LS-8670, Shin-Etsu Chemical Co., Ltd.), 56 g of methylhydrogensiloxane (KF- 99, Shin-Etsu Chemical Co., Ltd.) and 0.2 g of a chloroplatinic acid catalyst (1% chloroplatinic acid solution). Further 50 ml of hexane was added. The mixture in patty form was thoroughly mixed and heated at 60° C. for removing the solvent and precuring. It was cured in air at 200° C. for one hour.

The cured mixture in mass form was crushed and then milled in a ball mill using hexane as a dispersing medium to an average particle size of 15 μm. After removal of the solvent, the powder was placed in an alumina container, which was closed with a lid, and fired in an atmosphere-controllable, temperature-programmable muffle furnace in a nitrogen atmosphere at 1,000° C. for 3 hours. After cooling, the fired product was comminuted on a grinder (Masscolloider) with a set clearance of 20 μm, yielding Si—C—O composite powder having an average particle size of about 15 μm. It was similarly analyzed, with the results shown in Table 1.

It was evaluated as the negative electrode active material for a lithium ion secondary cell as in Example 1. The results are shown in Table 1.

Example 3

Using a vertical tubular furnace (inner diameter ~50 mm), the Si—C—O composite powder obtained in Example 1 was subjected to thermal CVD in a methane-argon mixture stream at 1,200° C. for 3 hours. The black mass thus obtained was disintegrated in an automated mortar. The CVD-treated Si—C—O composite powder had a surface coating carbon content of 14% and an average particle size of 13 μm.

It was evaluated as the negative electrode active material for a lithium ion secondary cell as in Example 1. The results are shown in Table 1 together with the analytical data.

Comparative Example 1

As in Example 1, 0.1 g of a chloroplatinic acid catalyst (1% chloroplatinic acid solution) was added to a curable siloxane mixture of 120 g of tetramethyltetravinylcyclotetrasiloxane (LS-8670, Shin-Etsu Chemical Co., Ltd.) and 80 g of methylhydrogensiloxane (KF-99, Shin-Etsu Chemical Co., Ltd.). The mixture was thoroughly mixed and precured at 60° C. for one day. The precured mixture in mass form was placed in a glass container and further in an atmosphere-controllable, temperature-programmable muffle furnace where it was heated in a nitrogen atmosphere at 200° C. for 2 hours until it was fully cured. The cured product was crushed and then milled in a ball mill using hexane as a dispersing medium to an average particle size of 10 μm. Then the powder was placed in an alumina container, which was closed with a lid, and fired in an atmosphere-controllable, temperature-programmable muffle furnace in a nitrogen atmosphere at 500° C. for 3 hours. After cooling, the fired product was comminuted on a grinder (Masscolloider) with a set clearance of 20 μm, yielding a Si—C—O powder having an average particle size of about 10 μm. This was similarly analyzed, with the results shown in Table 1.

It was evaluated as the negative electrode active material for a lithium ion secondary cell as in Example 1. The results are shown in Table 1.

Comparative Example 2

As in Example 1 and Comparative Example 1, 0.1 g of a chloroplatinic acid catalyst (1% chloroplatinic acid solution) was added to a curable siloxane mixture of 120 g of tetramethyltetravinylcyclotetrasiloxane (LS-8670, Shin-Etsu Chemical Co., Ltd.) and 80 g of methylhydrogensiloxane (KF-99, Shin-Etsu Chemical Co., Ltd.). The mixture was thoroughly mixed and precured at 60° C. for one day. The precured mixture in mass form was placed in a glass container and further in an atmosphere-controllable, temperature-programmable muffle furnace where it was heated in a nitrogen atmosphere at 200° C. for 2 hours until it was fully cured. The cured product was crushed and then milled in a ball mill using hexane as a dispersing medium to an average particle size of 10 μm. Then the powder was placed in an alumina container, which was closed with a lid, and fired in an atmosphere-controllable, temperature-programmable muffle furnace in a nitrogen atmosphere at 1,600° C. for 3 hours. After cooling, the fired product was comminuted on a grinder (Masscolloider) with a set clearance of 20 μm, yielding a Si—C powder having an average particle size of about 10 μm. It was similarly analyzed, and the results shown in Table 1 indicate that it was fully converted to silicon carbide SiC.

It was evaluated as the negative electrode active material for a lithium ion secondary cell as in Example 1. The results are shown in Table 1.

Comparative Example 3

A block or flake form of silicon oxide was milled on a ball mill using hexane as a dispersing medium. By passing the resulting suspension through a filter and removing the solvent in a nitrogen atmosphere, a powder having an average particle size of about 10 μm was obtained. The silicon oxide powder was evaluated as the negative electrode active material for a lithium ion secondary cell as in Example 1. The results are shown in Table 1.

TABLE 1

|  | Example | | | Comparative Example | | |
| --- | --- | --- | --- | --- | --- | --- |
|  | 1 | 2 | 3 | 1 | 2 | 3 |
| Elemental analysis | | | | | | |
| Silicon content (wt %) | 41 | 28 | 35 | 38 | 69 | 64 |
| Total carbon content (wt %) | 34 | 56 | 44 | 33 | 30 | <0.1 |
| Free carbon content (wt %) | 1.0 | 33 | 14 | 33 | 1.2 | <0.1 |
| Oxygen content (wt %) | 25 | 16 | 21 | 22 | 1 | 36 |
| Hydrogen content (wt %) | <0.1 | <0.1 | <0.1 | 7.0 | <0.1 | <0.1 |
| Cell performance | | | | | | |
| Initial charge capacity* (mAh/g) | 1160 | 902 | 950 | UM | 0 | 1300 |
| Initial discharge capacity* (mAh/g) | 915 | 740 | 770 | UM | 0 | 770 |
| Retention at 30th cycle (%) | 96 | 98 | 97 | UM | — | 21 |
| Retention at 50th cycle (%) | 93 | 96 | 96 | UM | — | 3 |

UM: unmeasurable
*The capacity is calculated based on the weight of siliceous active material (excluding graphite value added in the cell test for imparting conductivity).

Example 1 corresponds to Si—C—O composite particles.
Example 2 corresponds to Si—C—O composite particles with graphite added.
Example 3 corresponds to Si—C—O composite particles coated with carbon by CVD.

Comparative Example 1 corresponds to particles which have been insufficiently converted to an inorganic state due to a lower heat treatment temperature.

Comparative Example 2 corresponds to particles which have been converted to SiC due to a higher heat treatment temperature (1,600° C.).

Comparative Example 3 is silicon oxide.

Japanese Patent Application No. 2004-223719 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a Si—C—O composite, comprising adding particulate graphite which is surface treated with at least one silylating agent of formula (7):

wherein $R^8$ is a monovalent organic group and b is a positive number of 0.8 to 3 to a reactive silane or siloxane is of the average formula: $C_wH_xSiO_yN_z$ wherein w, x and y are positive numbers, z is 0 or a positive number, and (w−y) is greater than 0, or a mixture thereof in an amount of 1 to 80% by weight based on the total weight of the silane, siloxane or mixture thereof and the particulate graphite, curing the silane, siloxane or mixture thereof obtained by said adding step through heat curing or catalytic reaction into a crosslinked product and sintering the crosslinked product in an inert gas stream at a temperature in the range of 700 to 1,400° C. into an inorganic state.

2. The method of claim 1, further comprising, after the curing and/or sintering step, pulverizing to an average particle size of 0.1 to 30 μm.

3. The method of claim 1 wherein said reactive silane or siloxane is one or more silanes or siloxanes having the general formulae (1) to (5):

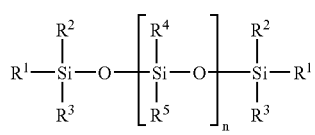

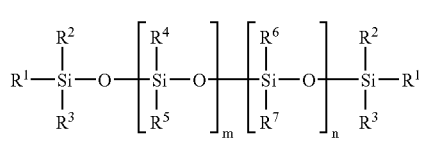

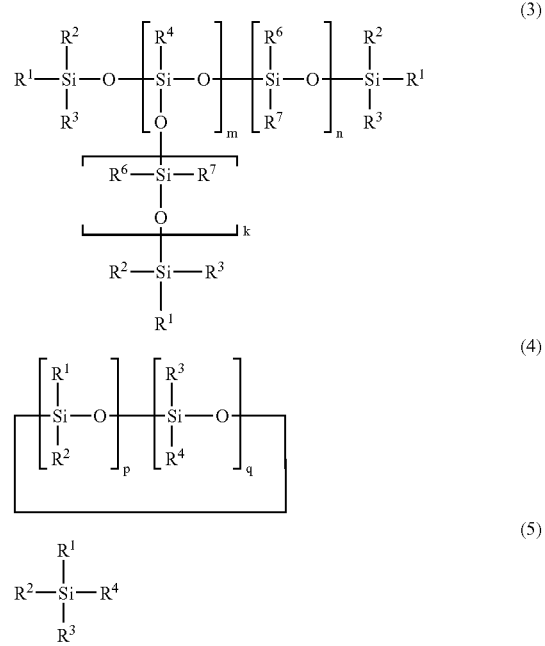

wherein $R^1$ to $R^7$ are each independently a hydrogen atom, hydroxyl group, hydrolyzable group or monovalent hydrocarbon group, m, n and k are numbers of 0 to 2,000, p and q are numbers of 0 to 10, p and q are not equal to 0 at the same time.

4. The method of claim 3 wherein said reactive silane or siloxane is a combination of a silane and/or siloxane having at least two SiH groups in a molecule and a siloxane having at least two aliphatic unsaturated groups in a molecule per ten silicon atoms, in which hydrosilylation reaction takes place in the presence of a hydrosilylation catalyst to form a crosslinked product.

5. The method of claim 1 wherein the surface of the Si—C—O composite powder is coated with carbon in an amount of 1 to 50% by weight based on the entire weight of the Si—C—O composite powder coated with carbon.

6. The method of claim 1, wherein said silylating agent is selected from the group consisting of hexamethyldisilazane, divinyltetramethyldisilazane, tetravinyldimethyldisilazane, and octamethyltrisilazane.

7. A negative electrode material for a non-aqueous electrolyte secondary cell, comprising a mixture of the Si—C—O composite and a conductive agent, an amount of the conductive agent being 5 to 60% by weight of the mixture and a total amount of carbon being 20 to 90% by weight of the mixture wherein said Si—C—O composite is in the form of particles having a void content of 1 to 70% by volume, and obtained by a method comprising:

adding particulate graphite which is surface treated with at least one silylating agent of formula (7):

wherein $R^8$ is a monovalent organic group and b is a positive number of 0.8 to 3 to a reactive silane or siloxane is of the average formula: $C_wH_xSiO_yN_z$ wherein w, x and y are positive numbers, z is 0 or a positive number, and (w−y) is greater than 0, or a mixture thereof, in an amount of 1 to 80% by weight based on the total weight of the silane, siloxane or mixture thereof and the particulate graphite, curing the silane, siloxane or mixture thereof obtained by said adding step through heat curing or catalytic reaction into a crosslinked product, sintering the crosslinked product in an inert gas stream at a temperature in the range of 700 to 1,400° C. into an inorganic state, pulverizing the sintered product to an average particle size of 0.1 to 30 μm, and coating the surface of the pulverized sintered product with carbon by heat treating the pulverized sintered product in an atmosphere containing at least an organic matter gas and/or vapor for chemical vapor deposition on the surface of the pulverized sintered product, in an amount of 1 to 50% by weight based on the entire weight of the Si—C—O composite powder coated with carbon.

8. The negative electrode material of claim 7, wherein said reactive silane or siloxane is one or more silanes or siloxanes having the general formulae (1) to (5):

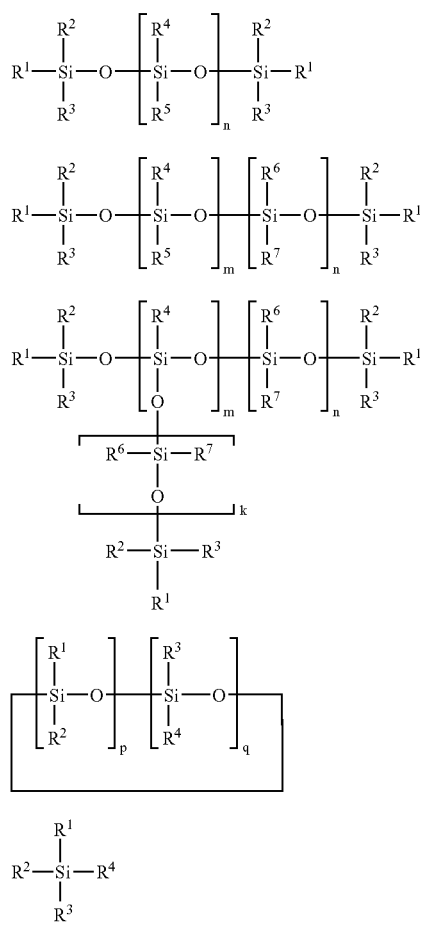

wherein $R^1$ to $R^7$ are each independently a hydrogen atom, hydroxyl group, hydrolyzable group or monovalent hydrocarbon group, m, n and k are numbers of 0 to 2,000, p and q are numbers of 0 to 10, p and q are not equal to 0 at the same time.

9. The negative electrode material of claim 7, wherein said reactive silane or siloxane is a combination of a silane and/or siloxane having at least two SiH groups in a molecule and a siloxane having at least two aliphatic unsaturated groups in a molecule per ten silicon atoms, in which hydrosilylation reaction takes place in the presence of a hydrosilylation catalyst to form a crosslinked product.

10. The negative electrode material of claim 7, wherein said silylating agent is selected from the group consisting of hexamethyldisilazane, divinyltetramethyldisilazane, tetravinyldimethyldisilazane, and octamethyltrisilazane.

11. A method for preparing a negative electrode material for a non-aqueous electrolyte secondary cell comprising:

adding particulate graphite which is surface treated with at least one silylating agent of formula (7):

$$R^8_b Si(Z)_{(4-b)/2} \qquad (7)$$

wherein $R^8$ is a monovalent organic group and b is a positive number of 0.8 to 3 to a reactive silane or siloxane is of the average formula: $C_w H_x SiO_y N_z$ wherein w, x and y are positive numbers, z is 0 or a positive number, and (w–y) is greater than 0, or a mixture thereof, in an amount of 1 to 80% by weight based on the total weight of the silane, siloxane or mixture thereof and the particulate graphite, curing the silane, siloxane or mixture thereof obtained by said adding step through heat curing or catalytic reaction into a cross linked product, and sintering the crosslinked product in an inert gas stream at a temperature in the range of 700 to 1,400° C. into an inorganic state.

12. The method of claim 11, wherein the sintered product is pulverized to an average particle size of 0.1 to 30 μm.

13. The method of claim 12, wherein the surface of the pulverized sintered product is coated with carbon by heat treating the pulverized sintered product in an atmosphere containing at least an organic matter gas and/or vapor at a temperature in the range of 700 to 1,400° C. for chemical vapor deposition on the surface of the pulverized sintered product in an amount of 1 to 50% by weight based on the entire weight of the Si—C—O composite powder coated with carbon.

14. The method of claim 11, wherein said silylating agent is selected from the group consisting of hexamethyldisilazane, divinyltetramethyldisilazane, tetravinyldimethyldisilazane, and octamethyltrisilazane.

15. A method for preparing a negative electrode material for a non-aqueous electrolyte secondary cell comprising:

adding particulate graphite which is surface treated with at least one silylating agent of formula (7):

$$R^8_b Si(Z)_{(4-b)/2} \qquad (7)$$

wherein $R^8$ is a monovalent organic group and b is a positive number of 0.8 to 3 to a reactive silane or siloxane is of the average formula: $C_w H_x SiO_y N_z$ wherein w, x and y are positive numbers, z is 0 or a positive number, and (w–y) is greater than 0, or a mixture thereof, in an amount of 1 to 80% by weight based on the total weight of the silane, siloxane or mixture thereof and the particulate graphite, curing the silane, siloxane or mixture thereof obtained above adding step through heat curing or catalytic reaction into a crosslinked product, sintering the crosslinked product in an inert gas stream at a temperature in the range of 700 to 1,400° C. into an inorganic state, and mixing the sintered product and a conductive agent so that an amount of the conductive agent is 5 to 60% by weight of the mixture and a total amount of carbon is 20 to 90% by weight of the mixture.

16. The method of claim 15 wherein the sintered product is pulverized to an average particle size of 0.1 to 30 μm.

17. The method of claim 16, wherein the surface of the pulverized sintered product is coated with carbon by heat treating the pulverized sintered product in an atmosphere containing at least an organic matter gas and/or vapor at a temperature in the range of 700 to 1,400° C. for chemical vapor deposition on the surface of the pulverized sintered product in an amount of 1 to 50% by weight based on the entire weight of the Si—C—O composite powder coated with carbon.

18. The method of claim 15, wherein said silylating agent is selected from the group consisting of hexamethyldisilazane, divinyltetramethyldisilazane, tetravinyldimethyldisilazane, and octamethyltrisilazane.

* * * * *